(12) United States Patent
Bauduin et al.

(10) Patent No.: US 10,392,978 B2
(45) Date of Patent: Aug. 27, 2019

(54) FILTERING OF A FLOW OF GAS/PARTICLES

(71) Applicant: Safran Transmission Systems, Colombes (FR)

(72) Inventors: Lionel Bauduin, Moissy-Cramayel (FR); Maxence Guillemont, Moissy-Cramayel (FR); Julien Viel, Moissy-Cramayel (FR); Stéphane Prunera-Usach, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 415 days.

(21) Appl. No.: 15/303,449

(22) PCT Filed: Apr. 15, 2015

(86) PCT No.: PCT/FR2015/051028
§ 371 (c)(1),
(2) Date: Oct. 11, 2016

(87) PCT Pub. No.: WO2015/159028
PCT Pub. Date: Oct. 22, 2015

(65) Prior Publication Data
US 2017/0030233 A1    Feb. 2, 2017

(30) Foreign Application Priority Data

Apr. 16, 2014    (FR) ..................... 14 53385

(51) Int. Cl.
*B01D 39/00*    (2006.01)
*F01M 11/03*    (2006.01)
(Continued)

(52) U.S. Cl.
CPC ............ *F01M 11/03* (2013.01); *B01D 45/04* (2013.01); *B01D 45/08* (2013.01); *B01D 45/14* (2013.01);
(Continued)

(58) Field of Classification Search
CPC ... F01M 11/03; F01M 2013/0422; F02C 7/06; B01D 45/08; B01D 45/04; B01D 45/14; B64D 2033/0293; B64D 33/02
See application file for complete search history.

(56) References Cited

U.S. PATENT DOCUMENTS 2,193,883 A * 3/1940 Reeves ..................... B04C 3/00
                                                55/304
2,806,551 A * 9/1957 Heinrich ................... B04C 3/04
                                                55/340

(Continued)

FOREIGN PATENT DOCUMENTS

DE    10 2007 048321 A1    4/2009
EP    0 095 354 A1    11/1983
(Continued)

*Primary Examiner* — Dung H Bui
(74) *Attorney, Agent, or Firm* — Blank Rome LLP

(57) ABSTRACT

A device for filtering a flow of gas conveying liquid or solid particles in a flow channel. According to the invention, the particles are imparted a speed that is high enough to project same by inertia into the opening of a recovery channel formed inside the flow channel, while the gas from the flow bypasses said opening due to a specific configuration of the flow conditions of a perfect fluid in the flow channel and in the collection channel.

12 Claims, 2 Drawing Sheets

(51) Int. Cl.
*B01D 45/14* (2006.01)
*B01D 45/04* (2006.01)
*B01D 45/08* (2006.01)
*F02C 7/06* (2006.01)
*B64D 33/02* (2006.01)
*F01M 13/04* (2006.01)

(52) U.S. Cl.
CPC ............... *F02C 7/06* (2013.01); *B64D 33/02* (2013.01); *B64D 2033/0293* (2013.01); *F01M 2013/0422* (2013.01)

(56) References Cited

U.S. PATENT DOCUMENTS

| | | | | |
|---|---|---|---|---|
| 3,895,930 | A | * | 7/1975 | Campolong ........... B01D 45/16 55/394 |
| 3,952,972 | A | | 4/1976 | Tedstone et al. |
| 3,954,428 | A | * | 5/1976 | Marple ................ G01N 1/2247 96/417 |
| 4,140,005 | A | * | 2/1979 | Kittelson ........... G01N 33/0042 73/28.02 |
| 4,255,174 | A | * | 3/1981 | Simpson ................ B01D 45/16 55/306 |
| 4,279,627 | A | | 7/1981 | Paul et al. |
| 4,311,494 | A | * | 1/1982 | Conner ................ B01D 45/16 55/394 |
| 4,456,458 | A | | 6/1984 | Gilbertson |
| 4,537,608 | A | * | 8/1985 | Koslow ................ B01D 50/002 55/337 |
| 4,767,524 | A | * | 8/1988 | Yeh ........................... B07B 7/00 209/133 |
| 4,981,502 | A | | 1/1991 | Gottschalk |
| 5,231,865 | A | * | 8/1993 | McDermott ............. G01N 1/38 73/28.04 |
| 5,549,721 | A | | 8/1996 | Shchipachev |
| 5,603,602 | A | | 2/1997 | Romani |
| 6,033,450 | A | | 3/2000 | Krul et al. |
| 6,331,195 | B1 | * | 12/2001 | Faust ..................... B01D 45/16 55/396 |
| 6,540,802 | B2 | * | 4/2003 | Trautmann ....... F02M 35/10013 55/337 |
| 7,691,185 | B2 | * | 4/2010 | Darke ....................... B04C 3/06 55/328 |
| 2010/0307167 | A1 | | 12/2010 | Morreale |

FOREIGN PATENT DOCUMENTS

| | | |
|---|---|---|
| EP | 1582703 A2 | 10/2005 |
| GB | 2 136 325 A | 9/1984 |
| RU | 2 079 342 C1 | 5/1997 |
| RU | 2 124 133 C1 | 12/1998 |
| RU | 2 198 720 C2 | 2/2003 |
| RU | 121 752 U1 | 11/2011 |
| RU | 2 477 806 C2 | 3/2013 |
| SU | 1632468 A1 | 3/1991 |
| WO | WO 2009/046794 A1 | 4/2009 |
| WO | WO 2010/114377 A1 | 10/2010 |

* cited by examiner

FILTERING OF A FLOW OF GAS/PARTICLES

BACKGROUND OF THE INVENTION

1. Field of the Invention

The present invention relates to the general field of devices and methods making it possible to separate, or filter a flow of gas conveying liquid or solid particles, such as oil, from a flow containing a gas/particles mixture. A special field of application of the invention is that of gas turbine (turbojet and turboprop engines) aircraft engines.

2. Description of the Related Art

Gas turbine aircraft engines comprise enclosures containing bearings and gears which are lubricated and cooled with oil. In order to prevent oil from leaking out of the enclosures, seals are positioned between the rotating parts and the stationary parts of the enclosures, or even between the rotating parts. Among the various seals available, those having the longest service life are labyrinth seals and brush seals, with no contact between the parts in the first case and a very limited contact in the second case.

To provide perfect sealing of the enclosures provided with labyrinth seals and brush seals, air flow has to go through the seals, with such air flow being generally sampled at one stage of the engine compressor. Using such a method also implies the provision of devices separating oil from air to be exhausted outside the engine. Such devices—commonly referred to as oil separators—are well known per se. Reference can be made, for example, to documents EP 1582703, U.S. Pat. Nos. 4,981,502 and 6,033,450 which disclose various types of de centrifugal oil separators.

To operate properly, the oil separators of the centrifugal type must rotate at high speed, whereas the flow of air and oil circulates and is filtered through foams. The higher the rotating speed of such oil separators, the higher the pressure drops generated. As the enclosure seals are so designed as to be operated with a predefined pressure difference, when the oil separator generates a higher pressure drop, the sampling pressure at the compressors must be increased. Such sampling at a higher pressure is harmful to the engine performance, since the air sampled for operating the oil separators does not participate in the propulsion of the turbine engine, but also for cooling the bearings and the gears, since sampling at a higher pressure implies air being sampled at a higher temperature. Besides, the air flow which is taken from a stage of the compressor depends on the engine operation speed, so that the minimum air flow required for sealing the enclosures and the operation of the oil separators are calculated on the basis of the slow phase of the engine (such phase corresponds to the engine operating speed, during which the sampled air flow is the lowest). During the other operating phases of the engine, and more particularly at full speed, the flow of air going through the enclosures is in excess as compared to what is sufficient to provide the sealing of the enclosures, which causes an over-consumption of oil with all the harmful effects entailed therein (pollution, additional cost, etc . . . ).

Besides, the centrifugal oil separators currently used are subjected to a very specific and restrictive integration in the turbine engine, because of the existing rotating parts which have to be driven within the oil separators.

SUMMARY OF THE INVENTION

The invention disclosed here provides for an efficient, easily implemented and economical solution to the above-mentioned problems.

For this purpose, the invention relates to a device for filtering a flow of gas conveying liquid or solid particles such as a oil separator, with said device comprising:

a flow channel comprising a neck extended by an enlargement in the downstream direction, a recovery channel having an upstream opening arranged inside the flow channel so as to be substantially aligned with the neck in the downstream extension thereof, with the recovery channel and the flow channel being so configured that the flow allowed to circulate in the recovery channel is less than the one allowed to circulate in the flow channel.

In order to better understand the positioning of the upstream opening of the recovery channel with respect to the neck of the flow channel, such upstream opening can be described as being positioned opposite the upstream facing the neck, while being inside the widened part of the flow channel.

The filtering device mentioned above thus has a relatively simple design, as regards its structure, since it requires no rotating part. Besides, it has relatively small dimensions, and can thus be more easily integrated into a turbine engine, for instance, than the centrifugal oil separators of the prior art. Besides, it operates with no foam-type filtering means, which reduces the resulting pressure drops. Using a sampling pressure as high as the one required for centrifugal oil separators at the compressors shall thus not be required in a turbine engine.

The operation of the preferred filtering device is based on the following principle: the flow containing air and particles flows through the flow channel up to the neck; at the widening of the flow channel downstream from the neck, the air contained in the flow, the behaviour of which can be compared to that of a perfect fluid, mainly by-passes the upstream opening of the recovery channel and flows on in the flow channel. As a matter of fact, the filtering device has been so configured that the flow allowed to circulate in the recovery channel is less than the one allowed to circulate in the flow channel. This is obtained for instance by increasing the flow resistance in the recovery channel, or by increasing the static pressure downstream from the recovery channel, or a combination of both.

The liquid or solid particles contained in the flow have a much higher density than air, and thus have a much higher inertia than air, and such inertia, because of the momentum of the particles, makes then flow mainly in the geometrical extension of the neck, downstream thereof, in spite of the widening of the flow channel. Such particles thus do not by-pass the upstream opening of the recovery channel, which is so arranged as to be substantially aligned with the downstream extension of the neck, but are introduced therein, on the contrary. The particles contained in the flow are thus mainly introduced into the recovery channel, whereas the air in same flow mainly by-passes the recovery channel so as to flow on in the flow channel.

The rate allowed in the recovery channel shall thus be preferentially defined so as to exclusively match the rate of the particles in the flow. The particles will thus not accumulate in the recovery channel and air will integrally circulate outside the recovery channel.

In a particular embodiment, the neck of the flow channel has a section having a size smaller than or equal to the section of the upstream opening of the recovery channel provided in the extension thereof. The section of the neck can also be said to be included in the section of the upstream opening of the recovery channel.

The flow channel may also have, upstream from the neck, a throat in the downstream direction.

Thanks to this characteristic, the principle of a venturi is re-created for the flow channel. Upstream from the neck, the flow is thus accelerated to the neck, so as to give the particles a higher momentum at the neck outlet than at the inlet thereof in the filtering device. In this case, the particles shall then be projected more efficiently, while still being too fast to be deflected, into the upstream opening of the recovery channel.

Particles suction means, such as a pump are preferably arranged in the recovery channel. Making an appropriate selection of pump characteristics thus makes it easy to make the allowed flow rate circulate in the recovery channel so that the filtering device is optimized, as explained above.

Advantageously, at least a portion of the flow channel is formed coaxially around the recovery channel downstream from the upstream opening of the recovery channel. In such a configuration, the air in the flow which mainly circulates in the flow channel about the upstream opening of the recovery channel, is not deflected much from its path, with respect to upstream from the neck. The pressure loss caused by the filtering device is thus reduced. The flow channel and the recovery channel can also be formed along and around the same longitudinal axis.

According to a particular embodiment, obstacles to the flowing of particles are formed in the flow channel downstream from the upstream opening of the recovery channel. The particles which remain in the flow channel, downstream from the upstream opening of the recovery channel are thus blocked and the filtering capacity of the device is enhanced.

The obstacles to the flowing of particles preferably comprise a buffer mounted across the flow channel. Such buffer can for instance comprise walls successively formed through the flow channel and comprising respective not aligned openings.

Besides, the buffer may comprise an intermediate wall comprising concentric grooves for the run-off of the particles on the upstream face thereof, and formed opposite a duct for the suction of the particles opening into the flow channel. Such solution makes it possible to efficiently exhaust the particles at the buffer, and the particles cannot undesirably accumulate in the filtering device.

The invention also relates to a turbine engine which comprises a filtering device as mentioned above, arranged in an air/oil mixture routing circuit.

In this case, the filtering device can be positioned in a box driving the accessories of the turbine engine, or be cast with a case of the turbine engine, and be connected:
at the inlet of the flow channel, to a bearing or a gear lubrication enclosure, and
at the outlet of the recovery channel, to an oil collecting circuit.

The last solution is particularly interesting since it provides for an optimum integration solution, which requires no additional attachment means. It should however be noted that, in any case, the filtering device, which is the object of the present patent application, offers integration capacities which are much greater and versatile than the centrifugal oil separator of the prior art.

As for the method for filtering a flow of gas conveying liquid or solid particles along a path, as recommended here, it shall be understood from the above that it is such that:
on said path is placed a recovery channel having an upstream opening arranged inside a flow channel, which comprises a neck extended by an enlargement in the downstream direction, so that said upstream opening is substantially aligned with the neck, along a downstream extension thereof,
and a flow is allowed to circulate in the recovery channel which is less than the one allowed to circulate in the flow channel.

BRIEF DESCRIPTION OF THE DRAWINGS

The various aspects of the solutions disclosed herein will be better understood, and other details, characteristics and advantages thereof will appear upon reading the following description given by way of a non restrictive example while referring to the appended drawings wherein.

DETAILED DESCRIPTION OF THE PREFERRED EMBODIMENTS

Figure 1:
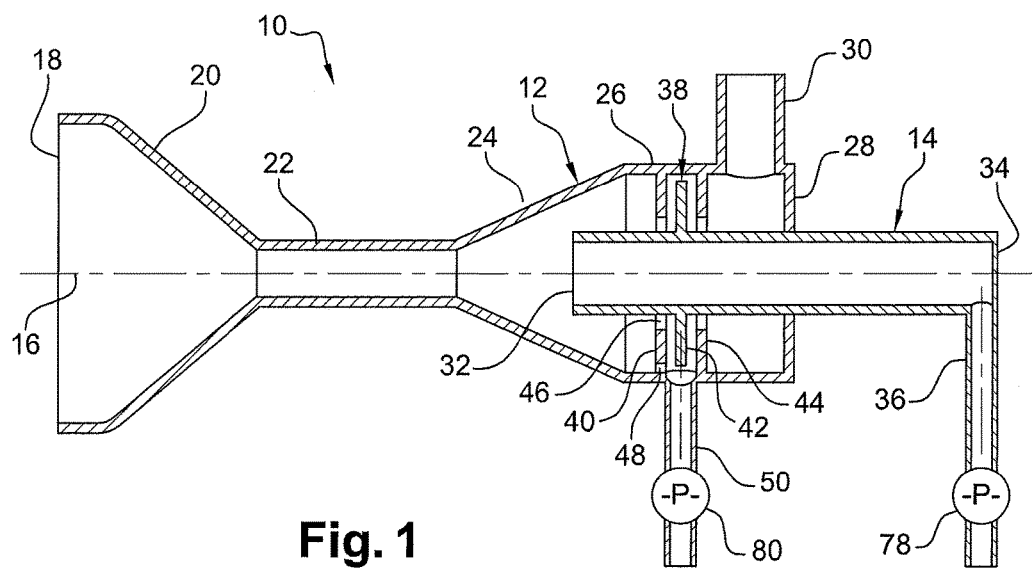
FIG. 1 is a schematic sectional view of the filtering device recommended here.

Reference is first made to FIG. 1 which shows a device 10 for filtering the particles in a flow, according to the invention. Such device is particularly advantageous as regards the filtering of oil from a flow comprising air and oil droplets.

The device comprises two channels 12, 14, with one 12 being a flow channel and the other one 14 being a channel for the recovery of the particles for filtering purposes.

The recovery channel 14 and the flow channel 12 respectively define first and second calibrated passages, or tubular segments, with the first one of these being adapted to allow a flow of fluid smaller than the one allowed in the second one.

The flow channel 12 is here integrally formed with a circular section and extends along a straight axis 16. However, such considerations have no restrictive purpose as regards the device operation, which implies that the section of the flow channel 12 could have any shape and the extension thereof could be not linear.

The flow channel 12 comprises an upstream opening 18 wherein the flow of air and particles, whether solid or liquid, is introduced, at a predefined rate and speed. Downstream from such opening 18, the flow channel 12 has a gradual reduction in the section 20 in the downstream direction, i.e. forming a funnel 20 in the downstream direction. The section throat directly opens downstream into a cylindrical portion 22 of the flow channel, which thus has a narrower section than that of the upstream opening 18. The last cylindrical portion 22 directly opens downstream into a channel portion 24 having a gradual increase in section in the downstream direction, i.e. it is tapered in the downstream direction. Such tapered portion 24 of the flow channel is connected downstream to a cylindrical portion 26, which has a larger section than the cylindrical portion 22, which will be referred to as the neck 22, placed between the funnel-shaped portion 20 and the tapered portion 24. The length of the neck 22 may vary, and even be punctual, in some cases. The downstream end 28 of the wide downstream cylindrical portion 26 is, in the case shown in FIG. 1, provided with walls, and is connected to a perpendicular exhaust channel 30 positioned close to such wall 28.

A recovery channel 14, a cylindrical one in the case shown here, is arranged coaxially with and inside the flow channel 12, downstream from the neck 22. The section of the recovery channel 14 is preferably larger than the section of the neck 22, and smaller than the wide downstream cylindrical portion 26 of the flow channel 12. The recovery channel 14 is open at the upstream end 32 thereof, with such upstream opening 32 facing, or being formed opposite the neck 22 further upstream. In FIG. 1, the upstream opening 32 is formed at the tapered portion 24 of the flow channel 12. The recovery channel 14 thus extends in the downstream direction and coaxially with the flow channel 12, and goes through the downstream end wall 28 of the flow channel 12. The downstream end 34 of the recovery channel is compartmentalized, and a suction duct 36 opens into the recovery channel 14 at the downstream end 34. The suction means 36 is connected downstream to a pump 78 regulating the suction rate.

Three successive transversal walls 40, 42, 44, forming a buffer 38, are formed through the flow channel 12, at the wide downstream cylindrical portion 26 of the flow channel 12, downstream from the upstream opening 32 of the recovery channel 14. Both upstream and downstream walls 40, 44 extend inwards from the wall of the flow channel 12, and each have a cylindrical opening 46 at the centre thereof which leaves an internal cylindrical flow space between same and the wall of the recovery channel 14. Additionally, the external part of the upstream wall 40 has at least one opening 48. The second intermediate wall 42 extends outwards from the wall of the recovery channel 14 while leaving an external cylindrical flow space between itself and the wall in the flow channel 12. Suction means 50 open into the recovery channel opposite such intermediate wall 42, between the upstream and downstream transverse walls 40, 44. Such suction means 50 are connected downstream to a pump 80 regulating the suction rate. The buffer 38 may also consist of more than three transversal walls, so long as the alternating pattern of the walls as shown above is complied with.

In operation, the flow containing air and particles enters the flow channel 12 through the upstream opening 18 thereof. The flow accelerates in the funnel-shaped portion 20 and reaches its maximum speed at the neck 22, which has the smallest section of the flow channel 12. At the outlet of the neck 22, at the tapered portion 24 where the upstream opening 32 of the recovery channel 14 is, the air and the particles of the flow have different respective behaviours.

At the neck 22 outlet, air behaves like a perfect fluid and flows partly along the extension of the flow channel 12 and partly into the recovery channel 14, and the respective pressure drops of such channels. Such parameters are configured, by so selecting the pump 78 that the flow rate allowed to circulate in the recovery channel 14 is substantially equal to the flow rate of the particles in the flow only, and in any case lower than the flow rate allowed to circulate in the flow channel 12 downstream from the upstream opening 32 of the recovery channel 14. Air thus mainly flows in the downstream direction in the flow channel 12 with respect to the recovery channel 14 and is exhausted through the downstream exhaust channel 30.

As for the particles, they have a behaviour complying with the conventional solids mechanics, and thus show inertia. The momentum of the particles at the neck 22 outlet, when accelerated through the funnel-shaped portion 20, thus inertially drives them in the extension of the direction of movement thereof at the neck 22 outlet, i.e. in the case shown here in the cylindrical extension of the neck 22. As the upstream opening 32 of the recovery channel 14 is formed around such cylindrical extension of the neck 22, the particles are introduced into the recovery channel 14. The device shall thus be so configured that the particles have a sufficient speed so that they are too fast to be deflected, by the air, about the upstream opening 32 of the recovery channel 14. As the rate allowed in the recovery channel 14 substantially matches the rate of the particles in the flow only, the particles will flow into the recovery channel 14 and be sucked by the downstream suction duct 36.

When particles remain in the flow channel 12 downstream from the upstream opening 32 of the recovery channel, the buffer 38 can intercept such particles, which shall deposit between the upstream 40 and downstream 44 walls of the buffer and shall be sucked by the suction means 50 using the pump 80.

It should be noted that the pumps 78 and 80 may be the same pump, which the suction means 36 and 50 are connected to. The operation of the device is not affected thereby.

Figure 2:
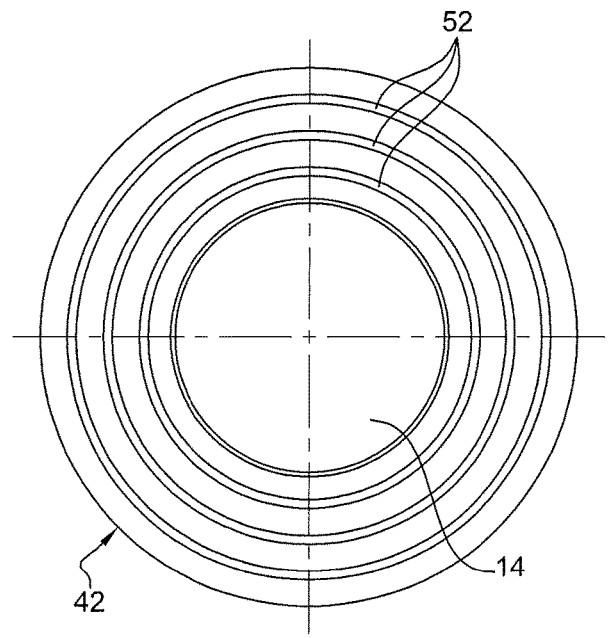
FIG. 2 is a schematic front view of a grooved wall in a buffer which can be integrated in said filtering device.
Figure 3:
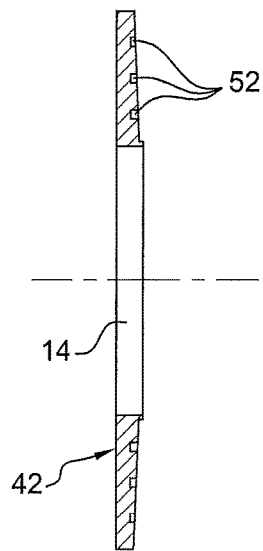
FIG. 3 is a schematic sectional side view of the grooved wall shown in FIG. 2.

Reference is now made to FIGS. 2 and 3 which show in greater details the intermediate wall 42 of the buffer 38.

The upstream face of the intermediate wall 42 is provided with concentric circular grooves 52. Additionally, the annular wall portion 42 outside each groove 52 is thinner than the annular wall portion inside such groove. In operation, the particles intercepted by this wall 42 thus flow to the outside of the flow channel 12 and the suction means 50, for example by gravity, circumferentially along such grooves 52 at the upper part of the device 10, and radially to the suction means 50 at the lower part of the device.

Figure 4:
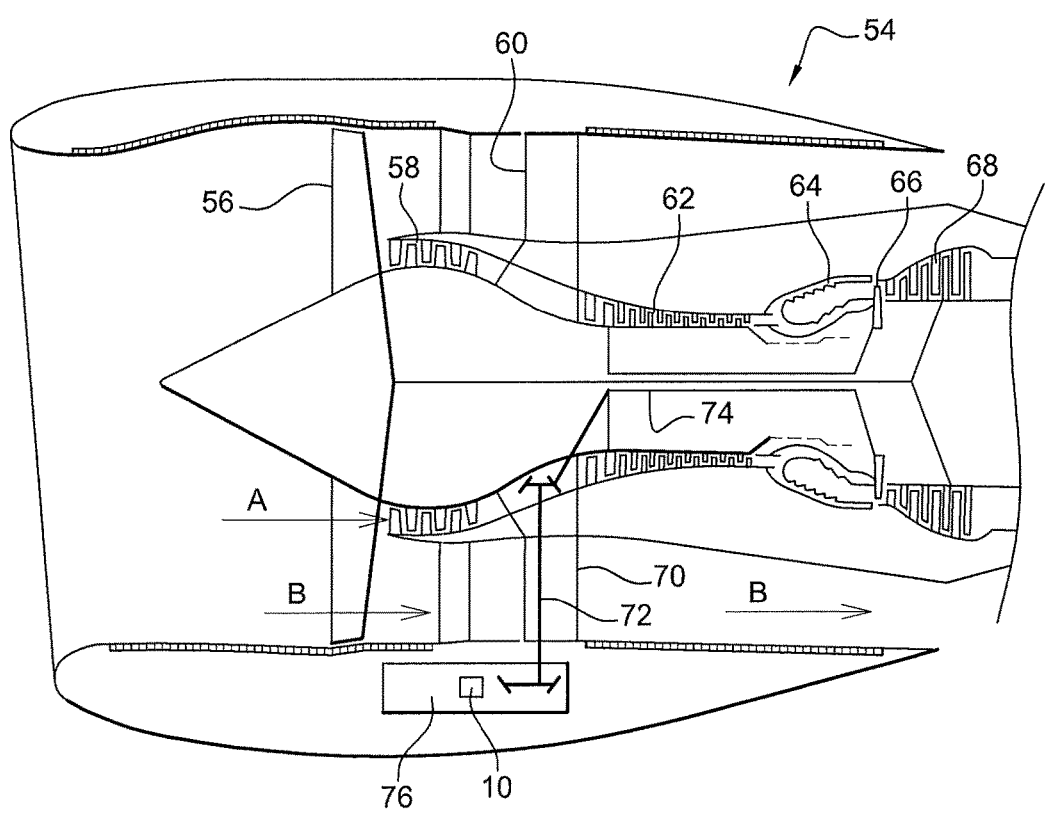
FIG. 4 is a schematic view of a turbine engine wherein the filtering device recommended here can be incorporated.

Reference is now made to FIG. 4, which shows a turbine engine 54 wherein the filtering device can be integrated so as to meet the operating constraints mentioned above. In the downstream direction, the turbine engine comprises a blower 56, a low pressure compressor 58, an intermediate case 60, a high pressure compressor 62, a combustion chamber 64, a high pressure turbine 66 and a low pressure turbine 68. The air entering the turbine engine 54 is separated into a primary air flow (A arrow) which circulates inside the low and high pressure compressors 58, 62 towards the combustion chamber 64 and then through the high and low pressure turbines 66, 68 and into a secondary air flow (B arrow) which by-passes the compressor, the combustion chamber and the turbine.

The intermediate case 60 comprises structural arms 70 which radially extend outwards. One of the arms 70 of the intermediate case 60 contains a radial shaft 72, the internal end of which is connected to the driving shaft 74 of the high pressure compressor by a couple of bevel pinions. The radially external end of the radial shaft 72 is connected by another couple of bevel pinions to the inlet of a gear box 76, comprising pinions driving a plurality of accessory equipment, such as, for instance, an oil pump, a hydraulic pump, a fuel pump, a starter and an electric generator. The various items of equipment described above show several bearings in enclosures, which have to be lubricated with oil and pressurized, as disclosed at the beginning of the present patent application. The need therefor exists to filter an air and oil flow at the outlet of such enclosures, after lubrication.

Thanks to its structural simplicity, the filtering device 10 can be integrated at the box 76 driving the accessories, or be formed in one piece with the various cases of the turbine engine, or be integrated close to a driving shaft of the turbine engine. Such device can easily be connected to the outlet of the lubrication enclosures to filter the oil of the outgoing flow.

The invention claimed is:

1. A filtering device to be integrated into a turbine engine for filtering a flow of gas conveying liquid or solid particles in said turbine engine, said device comprising:
    a flow channel comprising a neck extended by an enlargement in a downstream direction,
    a recovery channel having an upstream opening arranged inside the flow channel so as to be substantially aligned with the neck in the downstream extension thereof,
    with the recovery channel and the flow channel being se configured so that a flow allowed to circulate in the recovery channel is less than a flow allowed to circulate in the flow channel,
    wherein obstacles to the flowing of particles are formed in the flow channel downstream from the upstream opening of the recovery channel,
    wherein the obstacles to the flowing of particles comprise a buffer mounted across the flow channel,
    where the buffer comprises several transversal walls successively formed through the flow channel and comprising respective not aligned openings, and said walls include an intermediate wall being formed opposite a duct for the suction of the particles opening into the flow channel.

2. The filtering device according to claim 1, wherein a section of the neck of the flow channel is included in a section of the upstream opening of the recovery channel, said recovery channel being arranged in the extension of said flow channel.

3. The filtering device according to claim 1, wherein the flow channel has, upstream from the neck, a throat in the downstream direction.

4. The filtering device according to claim 1, wherein particles suction means are arranged in the recovery channel.

5. The filtering device according to claim 4, wherein the particles suction means include a pump.

6. The filtering device according to claim 1, wherein at least a portion of the flow channel is formed coaxially around the recovery channel, downstream from the upstream opening of the recovery channel.

7. The filtering device according to claim 1, wherein the intermediate wall comprises concentric grooves for run-off of particles on the upstream face of said intermediate wall, and said intermediate wall being formed opposite a duct for the suction of the particles opening into the flow channel.

8. A device to be integrated into a turbine engine for filtering therein a flow of gas conveying liquid or solid particles in said turbine engine, said device comprising:
    a flow channel comprising a neck extended by an enlargement in a downstream direction,
    a recovery channel having an upstream opening arranged inside the flow channel so as to be substantially aligned with the neck in the downstream extension thereof,
    with the recovery channel and the flow channel being configured so that a flow allowed to circulate in the recovery channel is less than a flow allowed to circulate in the flow channel,
    wherein obstacles to the flowing of particles are formed in the flow channel downstream from the upstream opening of the recovery channel,
    wherein the obstacles to the flowing of particles comprise a buffer mounted across the flow channel,
    wherein the buffer comprises several transversal walls successively formed through the flow channel and comprising respective not aligned openings, and said walls include an intermediate wall being formed opposite a duct for the suction of the particles opening into the flow channel, and,
    wherein particles suction means including a pump are arranged in the recovery channel.

9. A turbine engine comprising an air/oil mixture routing circuit and a filtering device according to claim 8, the filtering device being arranged in the air/oil mixture routing circuit.

10. The turbine engine according to claim 9, wherein the filtering device is positioned in a box driving accessories of the turbine engine, said filtering device being connected:
    at an inlet of the flow channel, to one of a bearing and a gear lubrication enclosure, and
    at an outlet of the recovery channel, to an oil collecting circuit.

11. The turbine engine according to claim 9, wherein the filtering device is cast with a case of the turbine engine, and said filtering device being connected:
    at an inlet of the flow channel, to one of a bearing and a gear lubrication enclosure, and
    at an outlet of the recovery channel, to an oil collecting circuit.

12. The turbine engine according to claim 9 is one of a turbojet engine and a turboprop engine.

* * * * *